United States Patent [19]
Barker

[11] Patent Number: 6,065,017
[45] Date of Patent: May 16, 2000

[54] APPARATUS AND METHOD FOR IDENTIFYING AND RECOVERING FROM DATABASE ERRORS

[75] Inventor: Kent D. Barker, Sandy, Utah

[73] Assignee: Novell, Inc., Provo, Utah

[21] Appl. No.: 09/002,283

[22] Filed: Dec. 31, 1997

[51] Int. Cl.[7] ........................................................ G06F 17/30
[52] U.S. Cl. .............................. 707/202; 714/15; 709/220
[58] Field of Search ..................... 707/8, 10, 9, 200–204; 709/220; 714/1, 2, 15

[56] References Cited

U.S. PATENT DOCUMENTS

| | | | |
|---|---|---|---|
| 5,717,897 | 2/1998 | McCrory | 707/8 |
| 5,787,247 | 7/1998 | Norin et al. | 709/220 |
| 5,812,773 | 9/1998 | Norin | 709/204 |
| 5,870,742 | 2/1999 | Chnag et al. | 707/8 |

*Primary Examiner*—Hosain T. Alam
*Attorney, Agent, or Firm*—Wolf, Greenfield & Sacks, P.C.; James H. Morris; Edward J. Russavage

[57] ABSTRACT

A database recovery system and method that associates integrity states with predetermined database elements, each representing one or more conditions of a characteristic of interest of the associated database elements. The system repairs or replaces the database elements having associated integrity states that are less preferred so as to improve their condition and advance their associated integrity state to a more preferred integrity state. The database elements are preferably user-selected, and may be any physical or logical portion of the database, such as data records, partitions and replicas. In an hierarchically-arranged object-oriented database, the database elements may be, for example, objects, attributes or properties of objects as well as data. The database recovery system automatically repairs database elements, preferably using available processes and tools, to advance the associated integrity state from a less-preferred to a more-preferred integrity state. The database recovery system includes a state identification unit for determining the conditions of each of the database elements, and to set the associated integrity state accordingly, and an element recovery unit for improving the conditions of the database elements so as to advance the plurality of associated integrity states to a more preferred integrity state. Preferably, the characteristic may be database element validity, and the conditions include whether the database elements have been damaged or repaired. The recovery processes include an external repair tool configured to repair damaged database elements; and replacement processes such as backup retrieval processes and replica synchronization processes, for replacing particular database elements having an associated first integrity state with a copy of the particular database elements having associated second integrity state, wherein the second integrity state is a more preferred integrity state than the first integrity state.

28 Claims, 11 Drawing Sheets

FIG. 3

| DATABASE ELEMENT INTEGRITY STATES | | | |
|---|---|---|---|
| DATABASE ELEMENTS | ASSOCIATED INTEGRITY STATES | | |
| | VALID INTEGRITY STATES | REPAIRED INTEGRITY STATES | DAMAGED INTEGRITY STATES |
| REPLICA | . | . | . |
| PARTITIONS | . . . | . . . | . . . |
| OBJECTS | . . . | . . . | . . . |
| ATTRIBUTES | . . . | . . . | . . . |
| DATA RECORDS | . . . | . . . | . . . |

APPARATUS AND METHOD FOR IDENTIFYING AND RECOVERING FROM DATABASE ERRORS

BACKGROUND OF THE INVENTION

1. Field of the Invention

The present invention relates generally to database management and, more particularly, to a system and method for identifying and recovering from database errors.

2. Related Art

Recently, more and more users who rely on critical data stored in a distributed and replicated database are beginning to require that such data be highly available. That is, the database must be available continuously regardless of hardware failures, network failures, software failures, or scheduled software and hardware maintenance. Generally only infrequent short periods of unavailability, totaling a few minutes to perhaps a few hours per year, are tolerable.

Unfortunately, a number of events can and often occur which prevent conventional databases from being highly available. For instance, database errors due to programming mistakes, faulty database administration procedures and improper user input result in conventional databases being unavailable. For example, an application or process may erroneously write data into an inappropriate area of the storage medium where the database is stored. An error may also result from synchronization procedures that reconcile data between different file servers using communication pathways which introduce errors into the data which is being passed between replicas of the database. There are also errors which are generally non-deterministic. Such errors include, for example, resource exhaustion, hardware failures in, for example, the database server, as well as a corrupted database or corrupted data structures within a database server process.

Typically, the occurrence of database errors is initially brought to the administrator's attention when there is inconsistent behavior or degradation of database performance. When this occurs, the database administrator may implement a number of conventional approaches to recover from the database error and return the damaged database to some previous state.

Many conventional database systems have provided transaction-based recovery techniques to recover from database errors. This enables a database to be restored to a consistent state after hardware or software failures that do not corrupt on-disk data. With archived transaction logs and periodic dumps, the database system can also recover from media failures or data corruptions. Although no committed transactions are lost, transaction-based recovery often prevents the database system from being highly available. Each period of unavailability may range from minutes to hours or even days depending upon the cause.

Some database management systems include log-based replication tools that replicate data in one database into one or more replicas. This is accomplished by reading committed transactions from a transaction log of the database in which the update is made, and performing the same updates in all of the replicas in the network. Depending upon the vendor and configuration options, the updates are either always made at a primary site and then propagated to the replicas, or the updates are made at any site and propagated to all other sites. To achieve high availability, these systems often employ a primary-standby primary scheme, where the standby primary is a replica that becomes the primary in the event of the failure of the original primary. There are, however, several problems with such an approach.

One problem is that the primary and the replica are only loosely synchronized. The state of the replica always lags the state of the primary by some unpredictable number of committed transactions. In the event of a primary failure or network failure, this certain number of prior committed primary transactions will be located only at the primary and unavailable to the standby primary. When the standby primary becomes accessible, it will be lack these transactions. Accordingly, such transactions will not be visible to users connected to the standby primary. When the old primary comes back on-line, it is generally brought up to date by providing it with all of the updates that occurred while it was unavailable. However, the transactions located only at the original may be inconsistent with the standby primary state. There may be no indication of an inconsistency, or these inconsistencies may show up as errors in a log file produced during resynchronization, and subsequently are addressed by conflict resolution procedures defined by default rules or user-specified actions.

Generally, the administrator may also invoke a conventional database repair tool, such as DSRepair (DSRepair is a registered trademark of Novell, Inc., Provo, Utah). DSRepair locates damaged portions of the database and reports such damage to the administrator. However, this and other database repair tools do not assist the administrator in determining what specifically has been damaged, and are limited in the extent to which the database is repaired. For example, the DSRepair tool reports the identified errors and simply attempts to make the database replica operational. This may result in the DSRepair tool deleting what it determines to be erroneous data or it could involve repair operations being performed on the data. However, because there is only one replica available to the DSRepair tool, it cannot determine whether the database error has been completely repaired. In addition, if the data is deleted, then the repaired replica will not be consistent with all the other replicas of the distributed database.

The DSRepair tool also generates a text report identifying the implemented remedial action for review by the database administrator. The database administrator must determine, based on this report, whether the repair processes were sufficient to continue normal operation, or whether portions or all of the database needs to be replaced. This manual intervention results in the database being unavailable for potentially extended periods of time. Furthermore, the extent to which the database is repaired is dependent upon the administrator's understanding of the database elements being replaced, limiting the integrity of the database by the expertise of the network administrator.

Because of the common problem of being unable to accurately identify the errors in the database and the extent to which they have been corrected, an entire replica is often replaced with a presumably valid replica, such as the primary or master replica. However, as noted, there may be inconsistencies in the replicas. In addition, this process is time consuming, adversely affecting the availability of the database. Furthermore, there is no guarantee that the new database does not have errors located in other portions of the database, or that it will not destroy or damage any new or unreplicated data in the original database.

What is needed, therefore, is a system and method that accurately identifies database errors and which repairs the errors quickly and efficiently, with minimal administrator intervention and with minimal dependence on the administrator's knowledge.

SUMMARY OF THE INVENTION

The present invention overcomes these and other drawbacks of conventional systems by providing a database recovery system and method that associates integrity states with predetermined logical and physical database elements, each representing a condition or conditions of a characteristic of interest of the associated database elements. The database recovery system repairs and/or replaces the database elements having associated integrity states that are less preferred to improve their condition and advance their associated integrity state to a more preferred integrity state. Significantly, the maintenance of integrity states representing predetermined conditions of characteristics of interest enables the present invention to efficiently identify database errors.

The database recovery system automatically repairs database elements, preferably using available processes and tools, to advance the associated integrity state from a less-preferred to a more-preferred integrity state. This eliminates the dependency upon the administrator, both in terms of time and expertise, and decreases the time from defect detection to full recovery, ensuring that the database is highly available and includes valid and reliable database elements.

The database elements are preferably user-selected, and may be any physical or logical portion of the database, such as data records, partitions and replicas. In an hierarchically-arranged object-oriented database, the database elements may be, for example, objects, attributes or properties as well as data. This provides a flexible recovery mechanism which may be optimally arranged to address a particular database type and structure.

In one aspect of the invention, a database recovery system for repairing a replica of a distributed database is disclosed. The database contains user-defined database elements and a plurality of integrity states associated with each of the database elements. Each of the plurality of integrity states represents a predetermined one or more conditions related to a characteristic of the associated database element. The database recovery system includes a state identification unit constructed and arranged to determine the predetermined conditions of each of the database elements, and to set the associated integrity state accordingly; and an element recovery unit constructed and arranged to improve the one or more conditions of the database elements so as to advance the plurality of associated integrity states to a more preferred integrity state. The database recovery system also includes a memory, accessible by the state identification unit and the element recovery unit, constructed and arranged to store the plurality of associated integrity states. The database may be a replica of a database distributed across a plurality of nodes of a network. For example, the distributed database is a global directory containing information relating to objects in the network.

In one preferred embodiment, the characteristic is database element validity, and the conditions include whether the database elements have been damaged or repaired. In this embodiment, the plurality of integrity states includes a valid state indicating the associated database element has not been damaged; a repaired state indicating the associated database element was damaged and subsequently repaired; and a damaged state indicating the associated database element is damaged and has not yet been, or cannot be, regenerated. In an alternative embodiment, the plurality of integrity states also includes an obsolete state indicating the associated database element has not been updated for a predetermined period of time.

In another embodiment, the characteristic is the age of the database element and the conditions include the time the database element has been updated. Other embodiments include, for example, a characteristic that is a source of the database element. In any of these embodiments, the plurality of associated integrity states may be represented by a plurality of flags, each of which represents an integrity state value.

In another aspect of the invention, a database recovery system for repairing a database having a plurality of user-defined database elements is disclosed. The database recovery system includes a plurality of integrity states, each of the plurality of integrity states representing a predetermined one or more conditions of predetermined characteristics of an associated database element. A state identification unit of the system is configured to identify which of the associated integrity states represents a current state of the one or more conditions. An element recovery unit applies processes to change the conditions of each of the plurality of database elements and to advance the associated integrity state from a less preferred integrity state to a more preferred integrity state.

In one particular embodiment, the characteristic is database element validity, and the state identification unit includes a validation processor configured to apply validation processes to the database so as to determine the validity of the plurality of database elements; and a first marking engine constructed and arranged to modify the plurality of associated integrity states to reflect results of the validation processes. The validation processes may include external validation tools, as well as resident validation processes configured to perform database element dependency analysis of the plurality of database elements.

The element recovery unit preferably includes at least one recovery process configured to change the predetermined conditions so as to advance each of the integrity states from a less preferred integrity state to a more preferred integrity state; and a second marking engine configured to modify the plurality of integrity states to reflect results of the at least one recovery process.

In one embodiment, the recovery processes includes an external repair tool configured to repair damaged database elements; and replacement processes configured to replace particular database elements having an associated first integrity state with a copy of the particular database elements having an associated second integrity state, wherein the second integrity state is a more preferred integrity state than the first integrity state. The replacement processes may include backup retrieval processes as well as replica synchronization processes.

In one preferred embodiment, the first marking engine resides in the external validation tool and the second marking engine resides in the external repair tool.

In a further aspect of the present invention, a method for recovering a database that includes a plurality of user-defined database elements is disclosed. The method includes the steps of: a) associating each of a plurality of integrity states with one of the plurality of database elements, each of the plurality of integrity states representing a predetermined one or more conditions related to a characteristic of the associated database element; and b) determining the one or more conditions of each of the database elements. Once these steps have been performed, the method includes the steps of c) modifying the associated integrity states to reflect the results of the step b); d) applying recovery processes to the database to improve the one or more conditions; and e) modifying the associated integrity states to reflect results of the step d).

In one embodiment, the characteristic is database element validity, and the above step b) includes 1) applying one or more validation processes to the database so as to determine the validity of the plurality of database elements; and 2) modifying the plurality of associated integrity states to reflect results of the step b)1). The application of one or more external validation tools to one or more of the plurality of database elements may be performed at step b)1).

In a particular embodiment, the above-noted step d) comprises the steps of: 1) modifying the one or more conditions so as to advance each of the plurality of integrity states from a less preferred integrity state to a more preferred integrity state; and 2) modifying the plurality of integrity states to reflect results of the step d)1).

Preferably, the step d)1) includes the steps: I) applying an external repair tool to one or more of the plurality of database elements; and ii) replacing particular database elements having an associated first integrity state with a copy of the particular database elements having an associated second integrity state, wherein the second integrity state is a more preferred integrity state than the first integrity state.

In a further aspect of the present invention, a database recovery system is disclosed. The database recovery system identifies database elements which have an associated integrity state that is a less preferred integrity state, the integrity state representing a predetermined one or more current conditions of a characteristic of the associated database element, the database recovery system repairing and replacing the database elements so as to advance the database elements to a more preferred integrity state.

In a still further aspect of the present invention, a controller for enabling a processor to recover a replica of a distributed database is disclosed. The database contains a plurality of user-defined database elements and a plurality of integrity states, each associated with one of the database elements. Each of the plurality of integrity states representing a predetermined one or more conditions related to a characteristic of the associated database element. The controller includes a state identifier constructed and arranged to determine the one or more conditions of each of the database elements, and to set the associated integrity state accordingly. The controller also includes an element recovery mechanism constructed and arranged to improve the one or more conditions of the database elements so as to advance the plurality of associated integrity states to a more preferred integrity state.

In a still further aspect of the present invention, a computer program product is disclosed. The product comprises a computer readable medium having computer program logic recorded thereon for enabling a processor in a lo computer system wherein a database is stored to recover from errors in the database. The computer program product is adapted to cause the computer system to perform the steps of a) associating each of a plurality of integrity states with one of the plurality of database elements, each of the plurality of integrity states representing a predetermined one or more conditions related to a characteristic of the associated database element; b) determining the one or more conditions of each of the database elements; c) modifying the associated integrity states to reflect results of the step b); d) applying recovery processes to the database elements having a less preferred integrity state to improve the one or more conditions; and e) modifying the associated integrity states to reflect results of step d).

Advantageously, the present invention accurately identifies and repairs database errors quickly and efficiently. The present invention also reduces the time from database defect detection to full recovery. This results in a highly available database while increasing the integrity and viability of the database.

Another advantage of the present invention is that is recovers from database errors with minimal administrator intervention and minimal dependence upon the administrator's knowledge of the database. This reduces the administration involved with performance of the repair operations and contributes to the quick and accurate recovery of the database provided by the present invention.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

FIG. 3 is a table illustrating the database element integrity states which may be associated with database elements in accordance with one embodiment of the present invention.

DETAILED DESCRIPTION

Figure 1:
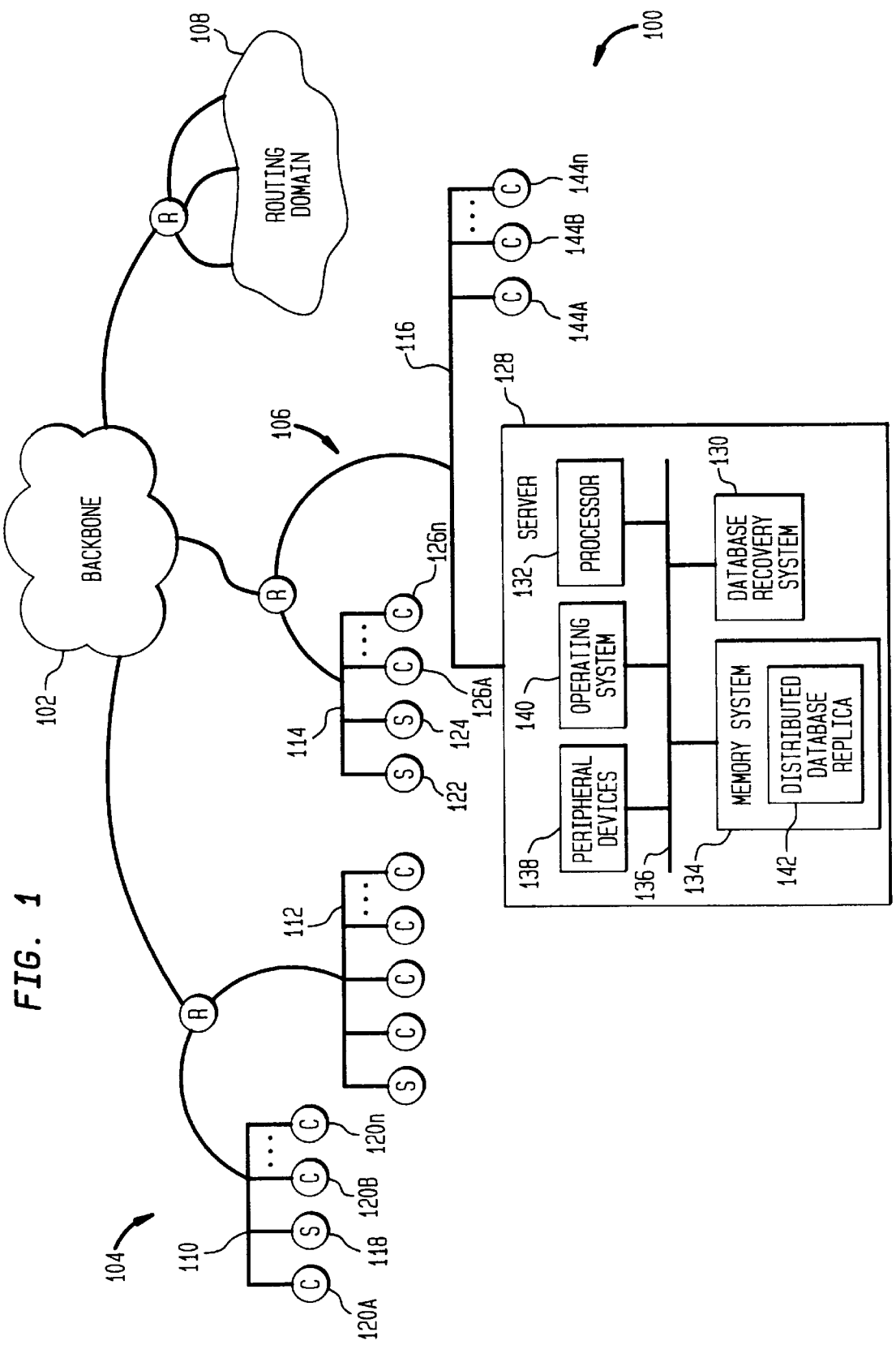
FIG. 1 is an exemplary network system wherein the database recovery system of the present invention may be implemented.

An exemplary internetwork system in which the database recovery system of the present invention may be implemented is illustrated in FIG. 1. The exemplary internetwork system 100 includes a plurality of routing domains 104–108 coupled to a backbone network 102. In the hierarchically-arranged distributed internetwork system 100, backbone 102 is the top-level, or central, connection path shared by the nodes and networks connected to it, managing the bulk of the traffic between communicating nodes.

Domains 104–108 are each a collection of one or more local networks, such as local area networks (LAN), metropolitan area networks (MAN), wide area networks (WAN), etc., that are attached to the backbone 102 through one or more routers. In the illustrative internetwork 100, domains 104, 106 and 108 are connected to backbone 102 through routers 110, 112 and 114, respectively. In the following discussion, the term "local network" shall be used to refer to all types of networks that may be included in a domain. Each domain may also contain intradomain routers for managing communications among local networks within a particular domain.

Source and destination nodes are, typically, computers (work stations and servers) but may be any type of device that can include a network interface card (NIC), such as a printer or modem. As shown in FIG. 1, each local network may include any combination of client and server nodes. For example, local network 110 includes a server node 118 and n number of client nodes 120, while local network 114 includes two server nodes 122, 124 and n client nodes 126.

An exemplary computer system implementing the database recovery system 130 of the present invention is shown in FIG. 1 as server node 128. Computer system 128 may be a general purpose computer system, which typically includes a processor 132 connected to a memory system 134 via an interconnection system such as computer bus 136. Peripheral devices 138 such as disk controllers, graphics cards, or the like, may be included in the computer system 128. The computer system 128 hosts an operating system 140 and is programmable using a high level computer programming language.

Server node 128 includes a replica 142 of a distributed database stored in memory system 134. Replicas of the distributed database may be stored in one or more servers in the internetwork 100, such as servers 118, 122 and 128. As will be described in detail below, the database recovery system 130 identifies database elements which have a less preferred integrity state and, through the application of database recovery tools and other processes, repairs or replaces damaged, obsolete and other database elements in an otherwise less than desirable condition, so as to advance those database elements to a more preferred integrity state. Although the functions and operations of the database recovery system are described with respect to the distributed database replica 142, it will become apparent to those skilled in the relevant art that the database recovery system 130 of the present invention may be applied to any type of database, regardless of whether it is stored locally, distributed or replicated. It should also be noted that the database recovery system 130 may be implemented in the server 128 and accessed by a network administrator through peripheral devices 138. Alternatively, the database recovery system 130 may be accessed by a network administrator through any of client nodes 144 attached to local network 116, as well as other client nodes in the internetwork 100, such as client nodes 120 or 126.

The general purpose computer system 128 preferably includes a commercially available processor 132 such as the Pentium microprocessor from Intel Corporation, PowerPC microprocessor, SPARC processor, PA-RISC processor or 68000 series microprocessor. Many other processors are also available. Such a processor usually executes the operating system 140 which may be, for example, the DOS, Windows 95, or Windows NT operating systems from the Microsoft Corporation, the System 7 operating system from Apple Computer, the Solaris operating system from Sun Microsystems, the Unix operating system available from many vendors such as Sun Microsystems, Inc., Hewlett-Packard and AT&T, or the NetWare operating system available from Novell, Inc.

The operating system 140 controls the execution of other computer programs and provides scheduling, debugging, input-output control, accounting compilation, storage assignment, data management, memory management, and communication control and related services. The processor 132 and operating system 140 define a computer platform for which application programs in high level programming languages are written. The server node 128 and client nodes 144 may be any type of computer system as described above, with a network interface card (NIC) or other communication device installed to communicate over the network 103. Other network management software may also be included as is well known in the art.

The operating system 140 interfaces with firmware and hardware in a well-known manner to access peripheral devices 138 and memory system 134. Memory system 134 may be any commonly available random access memory (RAM) or read-only memory (ROM), such a resident hard drive, CD ROM, tape system, etc.

The database recovery system 130 of the present invention is preferably implemented in C++, however, it may be implemented in any other well-known software language. For example, the database recovery system 130 may be implemented in an interpreted object-oriented programming language, such as Java, ActiveX or Smalltalk. Furthermore, the database recovery system 130 is capable of residing on any well-known computing platform. The software techniques for performing identification and recovery functions in accordance with the present invention typically reside in memory 134 and may be stored on a computer-readable medium such as, for example, magnetic disk, compact disk or magnetic tape. The software embodiment of the present invention may be loaded into the computer system 128 using an appropriate peripheral device 138, as known in the art. It should be understood, however, that the present invention is not limited to a particular computer platform, particular operating system or particular processor. The exemplary environments identified above are given by way of example only; the invention may be implemented in a variety of computer systems having a variety of system architectures.

In a global network configuration such as internetwork 100, a number of nodes are typically coupled via one or more networks to a central file server and resources such as applications and printer controllers are shared by the nodes in the system. The resources may be distributed among different devices in the internetwork, or stored in a central database. Access to the network resources may be controlled by creating an object for each resource and controlling access to that object. An object includes properties or attributes and the values of data corresponding to those properties. A network which uses objects to control accesses to resources is referred as an object-oriented network. In the exemplary internetwork 100, the distributed database 142 is an object-oriented network management database representing the resources in the internetwork 100.

In the exemplary environment illustrated in FIG. 1, the distributed database 142 is the Novell Directory Services® (NDS) database by Novell Incorporated. (NetWare Directory Services is a registered trademark of Novell, Incorporated). NDS provides a global directory containing information about all of the objects in the network 100. The NDS database is globally distributed to multiple network nodes to provide access to network resources regardless of where they are located. For ease of discussion, the distributed database and the replica 142 are referred to interchangeably, and should be considered to be equivalent for purposes of the present invention, unless the context indicates otherwise.

Figure 2:
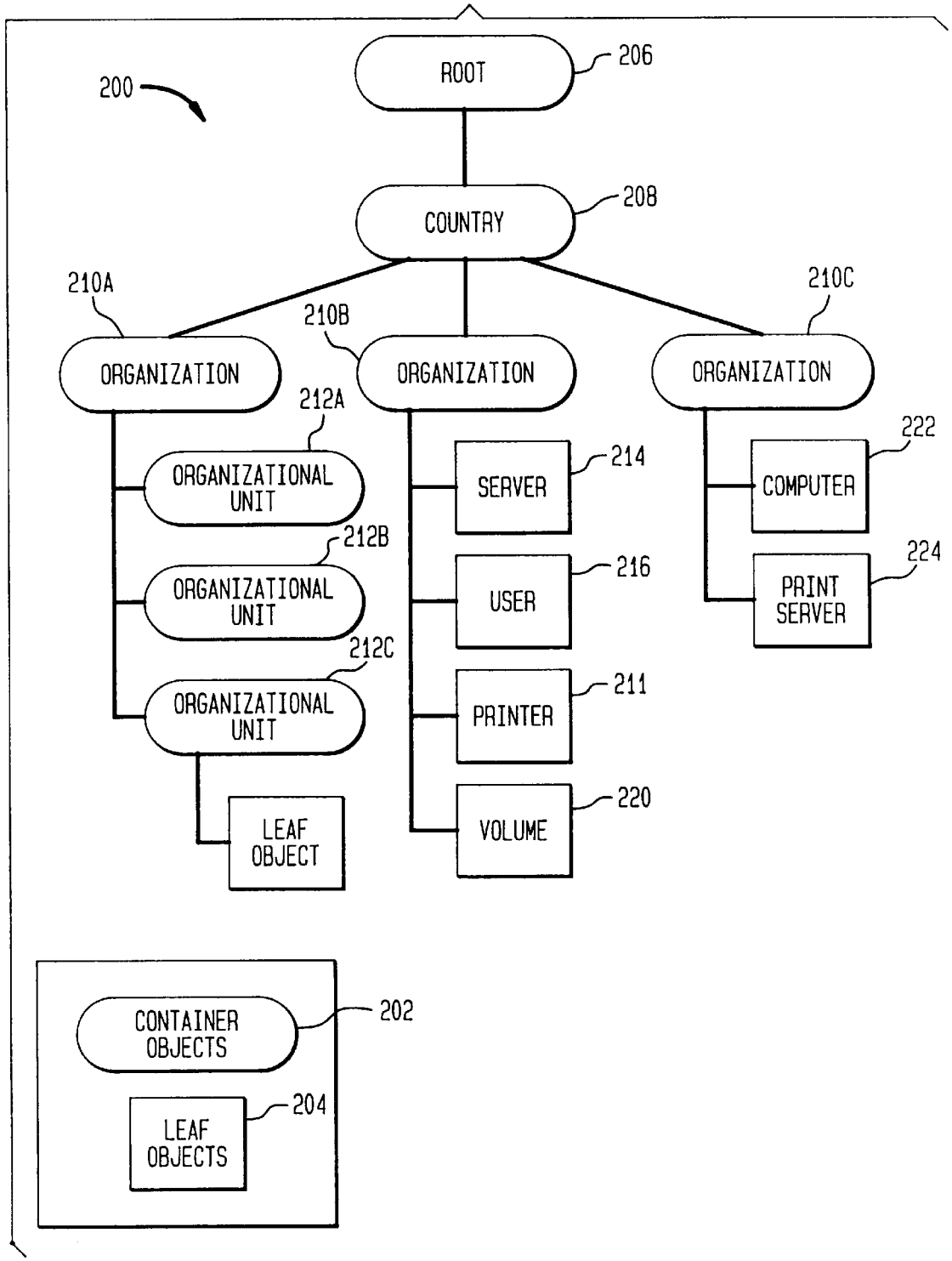
FIG. 2 is a block diagram of an exemplary hierarchial database structure that can be operate upon by the present invention.

FIG. 2 is a block diagram illustrating the hierarchial structure of the distributed database 142. As noted, in the illustrative Novell NDS database, the resources are referred to as objects and are organized in a hierarchical directory tree. For example, objects of the directory tree could include printers, users, servers, and the like. This hierarchical arrangement enables network managers to easily manage network resources using well known network management program such as the ManageWise network management program available from Novell, Inc., Provo, Utah. (ManageWise is a registered trademark of Novell, Inc.)

The object hierarchy 200 includes a number of container objects 202 and a number of leaf objects 204. Container or parent objects 202 can contain other objects, including other container objects 202 or leaf objects 204, while leaf or child objects 204 represent specific network resources; leaf objects 204 do not contain other objects. Container objects 202 may be created to accommodate any organizational arrangement. For example, a network administrator may create folder objects representing sites, buildings, group, or other meaningful organizational units. The user can then place an object representing specific network entities in a particular location folder object to identify the location of the network entity.

Referring to the illustrative hierarchial arrangement shown in FIG. 2, a root object 206 is a container object representing the entire universe of possible resources in the internetwork 100; accordingly, the root object 206 is located at the top of the object hierarchy. Root object 206 contains other container objects, including a country object 208. Within the country object 208 there are multiple organizational objects 210A–210C. Organization object 210A includes a number of organizational units 212A–212C which are themselves container objects.

The leaf objects 204 include representations of network entities in internetwork 100. For example, leaf object 214 represents server 128. Other network entities such as users, printers, disk volumes, work stations, print servers, etc., may be represented by leaf objects as shown by leaf objects 216–224. As is well known in the art, leaf objects 204 are generally managed by a network administrator using a well-known network management program.

As noted, each of the objects in the database 142 has properties or attributes. The object and its properties are broken down into segments that are stored into different data records in the distributed database 142. Each of the data records stores the same number of bytes with large logical elements stored in multiple data records. Accordingly, there are different record types. In one embodiment, there are records which contain object information, referred to as object records; records that contain property attributes, referred to as property records; records that contain information related to the association of partitions and replicas, referred to as partition records, etc.

Each object that is created in the internetwork 100 belongs to a certain class of objects. The object classes determine the properties, or attributes. A schema is a well known mechanism that includes a definitions database that specifies the permissible class types and attributes of the resource objects available in the network. The schema includes a set of attribute syntax definitions for defining the formats of each of the attributes. Each attribute syntax in the schema is specified by an attribute syntax name, a type and optionally a range of values that can be assigned to attributes of the given attribute syntax type. Attribute syntaxes thus are analogous to data types such as integer, float, string, or Boolean in conventional programming languages.

In accordance with the present invention, integrity states are associated with each element of a database. FIG. 3 is a table of the integrity states 304 which are associated with selected database elements 302 of the replicated database 142 in accordance with one embodiment of the present invention. As used herein, the terms "database elements" or "elements" refer to any logical or physical portion of the database 142. For example, in the illustrative object-oriented NDS database described above, the data is physically stored in data records 312. The network management information in each replica 142 of the database is stored in partitions 318, with each partition 318 containing a specific number of data records 312. Accordingly, database elements 302 which are assigned integrity states 304 preferably include the data records 312 in which the data is stored and the partitions 318 of the database replica 142. As noted above, the database 142 include objects and their attributes. Accordingly, in one embodiment of the present invention, integrity states 304 are associated with the objects 316 and attributes 314 in addition to the above elements. It should be noted that the physical and logical divisions and arrangements are specific to the type and structure of the database, and the relationship between the logical elements stored in the database. Accordingly, the elements 302 noted above are by example only, and are not to be considered limiting.

Each of the associated integrity states 304 represents one or more conditions of one or more characteristics of the associated database elements 302. The associated integrity states 304 are preferably defined in a predetermined manner to represent a varying range of conditions. In one embodiment of the present invention, the integrity states are primarily associated with the validity of the database elements 302. As noted, the validity of the database elements 302 is generally determined by the occurrence of database errors. Database errors may be caused by hardware or software malfunctions, including, for example, programming mistakes, faulty database administration procedures, faulty user input, problems associated with replica synchronization procedures, resource exhaustion, equipment failures and database corruption.

Accordingly, in one preferred embodiment, each database element 302 is assigned one of the following three integrity states 304: (1) a valid integrity state 306 representing that the associated database element 302 is not damaged and has not been damaged and subsequently repaired; (2) a damaged integrity state 310 representing that the associated database element 302 has been damaged; and (3) a repaired integrity state 308 representing that the associated database element 302 was once damaged and subsequently repaired.

Any other integrity state representing any other condition or set of conditions of one or more characteristics of the database element 302 may be included. For example, in another embodiment of the present invention, an additional integrity state 304 is included, referred to as an obsolete integrity state. The obsolete integrity state represents that the associated database element 302 has aged to an extent that confidence in the usefulness of the element 302 is reduced.

In one embodiment of the present invention, each of the possible integrity states 304 that may represent an associated database element 302 is represented by a flag. Thus, in the embodiment illustrated in FIG. 3, three flags are provided for each database element 302. A flag for one of the three integrity states 304 is set true/on while the flags for the other two integrity states 304 is set false/off. Preferably, the flags are each assigned a single bit in one or more words in a memory space such as memory 134. It should be noted that other forms of integrity state representation and storage location may be used to accommodate particular applications, such as state variables, program variables or the like.

Figure 4:
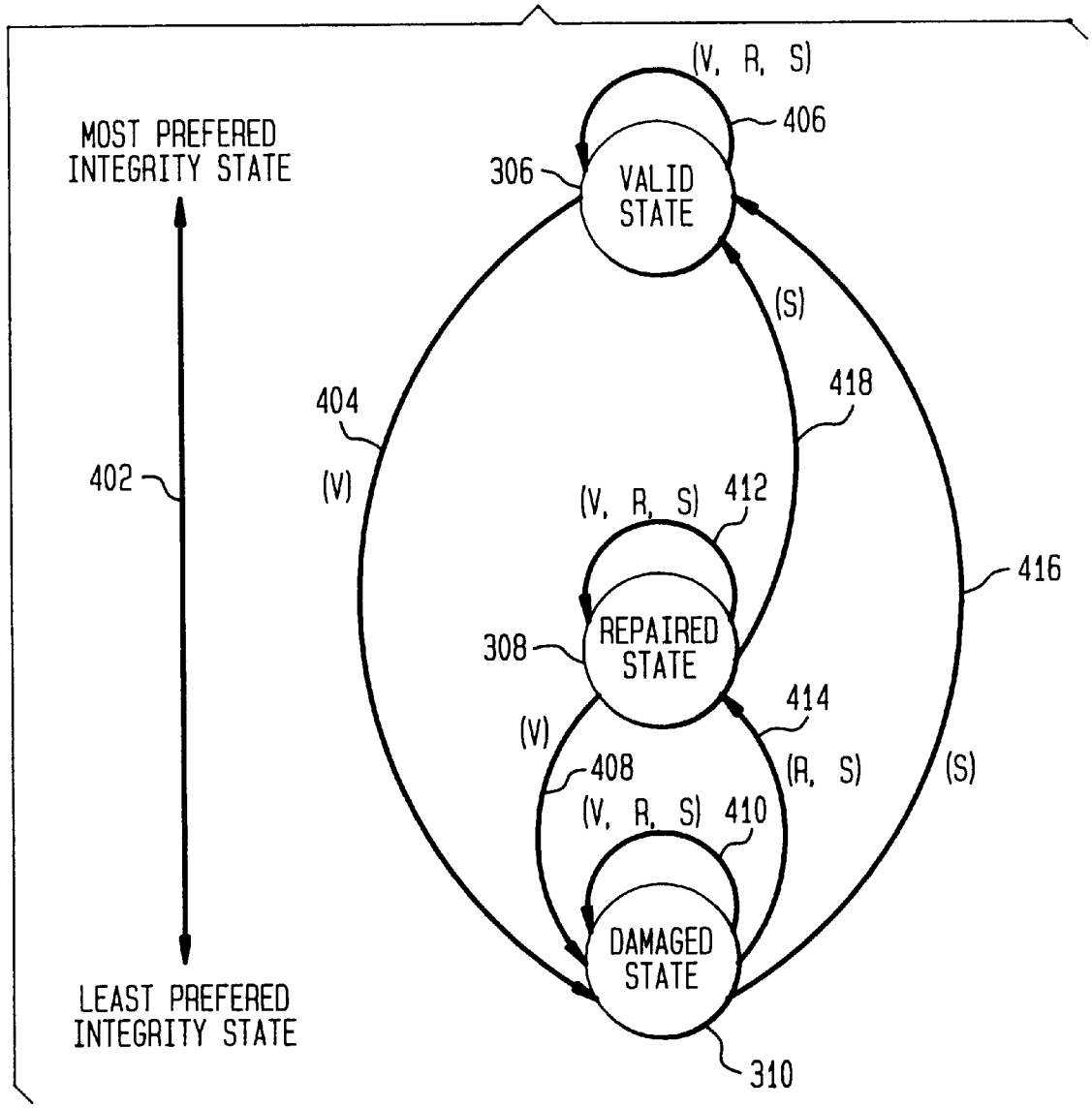
FIG. 4 is state diagram illustrating the transitions that may occur between the integrity states shown in FIG. 3 in accordance with one embodiment of the present invention.

FIG. 4 is a state diagram of the integrity states illustrated in FIG. 3. As shown by the arrow 402 in FIG. 4, the integrity states 304 have varying degrees of preference, based upon the confidence in the associated data element 302. That is, it is more preferred that a database element be assigned a valid integrity state 306 than a repaired integrity state 304. Likewise, a damaged integrity state 310 is not as preferred as a repaired integrity state 308.

The distinction between a valid integrity state 306 and a repaired integrity state 308 is implemented in this embodiment of the present invention to distinguish between those database elements that have never been damaged and those that are repaired. The repaired database elements may not have been repaired to their original condition and, as such, may not be a reliable as those database elements which have never been damaged.

State transitions occur in response to the application of three processes described below. The state transitions are represented by state transition arrows between the various states. Associated with each of the state transition arrows is a parenthetical showing the processes which may contribute to that particular state transfer. In the illustrative embodiment described above, there are three processes which are performed: a validation process or processes, represented by a "V"; one or more repair processes, represented by "R"; and synchronization processes, represented by "S".

The database recovery system 130 determines the integrity state 304 of each of the data elements 302 and attempts to repair or replace the database elements 304 to advance the integrity states from a less preferred integrity state to a more preferred integrity state. The transitions between the integrity states may occur in response to the implementation of various tools and processes which are described in detail below with reference to FIG. 5.

Figure 5:
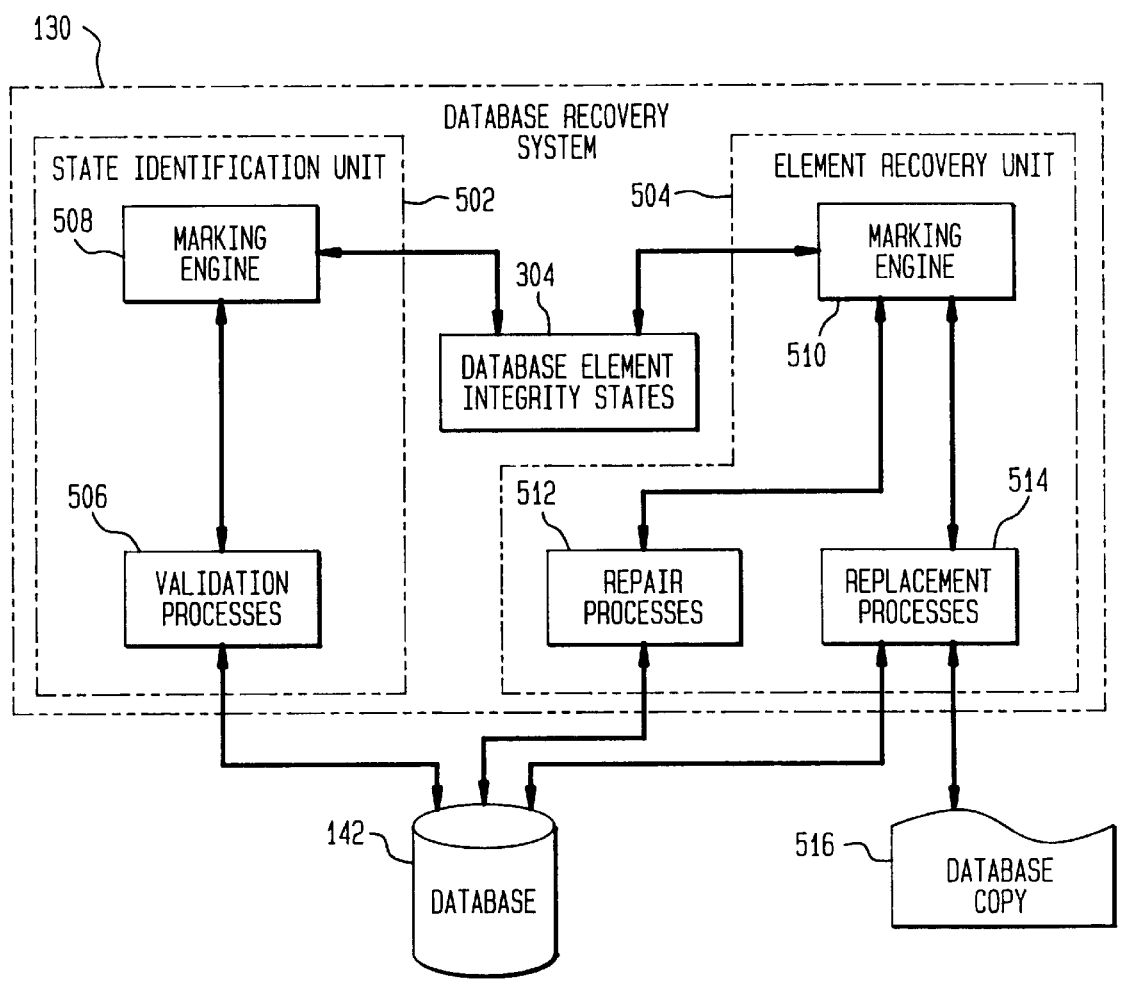
FIG. 5 is a functional block diagram of one embodiment of the database recovery system of the present invention.

FIG. 5 is a block diagram of one embodiment of the database recovery system 130 of the present invention implemented in the exemplary internetwork 100. In this embodiment of the present invention, the database recovery system 130 primarily includes an state identification unit 502 and an element recovery unit 504, both of which access and control the database element integrity states 304 in accordance with this embodiment of the invention.

The state identification unit 502 identifies which of the integrity states 304 represents the current condition(s) of the selected characteristic(s) of the associated database elements 302. As noted, in one embodiment of the present invention, the integrity states are primarily associated with the validity of the database elements 302. In accordance with this embodiment of the present invention, the state identification unit 502 includes validation processes 506 to determine the validity of the database elements 302. The validation processes 506 may include any appropriate validation processes now or later developed which is capable of determining the validity of the database elements 302. For database elements 302 which are logical elements of the object-oriented database 142, such as attributes and objects, the validation processes 502 preferably include processes that determine whether the logical element satisfies the syntax and schema requirements for that type of object or attribute. The state identification unit 502 includes a marking engine 508 that reads and sets the database element integrity states 304 to reflect the results of the validation processes 506.

A preferred embodiment of the verification processes 506 also performs database element dependency analysis to determine whether a database element should be assigned a particular integrity state due to the results of the validity tests performed on another database element. For example, as noted, a logical element is associated with the data records which contain the data for the logical element. It is not uncommon, for example, for objects or attributes to require a large number of data records for storage. If more than a threshold amount or percentage of data records which store data for a particular logical element are damaged, then the logical element may be considered to be damaged as well and its integrity state is set accordingly, regardless of whether the logical element was independently determined to be valid or damaged.

The above approach may also extend to other parent/child relationships throughout the hierarchial database 142. For example, one database element, such as a container object, may be assigned an integrity state due to the results of the validity tests performed on its child leaf objects. Likewise, an entire replica may be considered to be damaged in a sufficient number of objects are determined to be damaged. Similar dependencies may exist beyond the parent/child relationship, depending upon the database. For example, in the illustrative object-oriented NDS database described above, when a predetermined number of attributes of an object are determined to be damaged for failing to satisfy the requisite syntax requirements, the object which owns those attributes may also be considered to be damaged.

Referring to FIG. 4, the above embodiment of the state identification unit 502 modifies the integrity states 304 as described below. Since, as noted, the state identification engine 302 in this embodiment validates the database elements, the process performed by the state identification unit 502 is represented by a "V" in FIG. 4.

The validation process may result in the integrity state 304 for an associated database element 302 to transition from the valid integrity state 306 to the damaged integrity state 310, as shown by state transition line 404. Should the database element 302 be determined to be valid, than the application of the validation processes by the state identification unit 502 will not change the integrity state as shown by the "V" contribution to state transition line 406. Should a database element 302 have been previously repaired and subsequently determined to be damaged, then the integrity state will be changed accordingly, as shown by the "V" contribution to state transition line 408. If a database element 302 has been previously determined to be damaged and the validation process is subsequently applied, then the integrity state will remain as damaged, as shown by the "V" contribution to state transition line 410. Finally, if a database element 302 has been previously determined to be damaged and subsequently repaired, the subsequent application of a validation process will result in no change to the integrity state if the applied validation processes do not detect an error condition, as shown by the "V" contribution to state transition line 412.

Referring again to FIG. 5, the element recovery unit 504 applies processes to change the condition(s) of the desired database elements 302 characteristics to advance the integrity state 304 of the database elements 302 from a less preferred integrity state to a more preferred integrity state. The element recovery unit 504 includes a marking engine 510 that receives the results of repair processes 512 and, preferably, replacement processes 514.

In the embodiment shown in FIG. 5, the marking engine 510 interfaces with repair processes 512 and replacement processes 514. The element marking engine 510 may invoke the repair processes 512, providing the repair processes 512 with the data elements 302 having an associated damaged integrity state 310. The repair processes 512 provides the marking engine 510 with the results of the repair processes which then updates the undergird states 304 accordingly.

Referring to FIG. 4, the element recovery unit 504 changes the integrity states 304 based upon the results of the applied repair processes performed by the repair processes 512. If the database element 302 is damaged and the applied repair processes fail to repair the database element 302, then the integrity state 304 associated with the database element 302 is not changed, as shown by the "R" contribution to the state transition line 410. However, if the repair processes 512 were successful, then the integrity state 304 associated with the database element 302 is changed from a damaged integrity state 310 to an integrity state 308 of "repaired", as shown by the "R" contribution to the state transition line 414. Should the application of the repair processes be applied to a database element having a valid integrity state 306 or a repaired integrity state 308, then the integrity state 304 associated with the database element 302 is not changed, as shown by the "R" contribution to the state transition lines 406 and 412.

In accordance with the present invention, the element recovery unit 504 includes one or more processes which enable the database elements 302 to be replaced with a copy 516 of the elements 302 that have a more preferred integrity state than those elements 302 stored in the database 142. Replacement processes 514 may include, for example, backup retrieval processes or replica synchronization processes. The replacement processes 514 provide the marking engine 510 with the integrity state of the copy of the element 302 obtained from the database copy 516, which updates the integrity states 304 to indicate the new integrity state of the replaced database element 302.

As noted, the database 142 operated upon in the illustrative embodiment of the present invention is a replicated database. That is, there are multiple copies of the same database located in multiple servers in the internetwork 100. Generally, there are well known synchronization processes which are performed periodically or after the occurrence of certain events to synchronize the data stored in the replicated databases. For example, synchronization processes may be performed because there are new updates, such as a user logging into the internetwork 100, causing the object representing the user to receive a new log-in time, or synchronization processes may be performed according to a predetermined schedule, such as daily or hourly.

In one preferred embodiment, the database 142 is a replica of a distributed database, and the replacement processes 514 is a replica synchronization process. In accordance with this embodiment, the marking engine 510 makes available the integrity states 304 of the database elements 302 to the synchronization processes. For those database elements 302 having a repaired integrity state 308 or a damaged integrity state 310, the replica synchronization process determines whether the same database element 302 in the replicas with which it is synchronizing has a more preferred integrity state 304. If so, then the synchronization process includes those database elements 302 in the transfer of data from the database copy 516 to the database replica 142.

It should be noted that this process preferably occurs at all levels of the hierarchial database 142, whether it be a single attribute of an object, the entire object, a particular data record or the entire replica. In an alternative embodiment, the element recovery unit 504 determines the integrity states associated with each of the data elements 302 and provides the synchronization processes with the identification of those data elements 302 which have an associated integrity state of repaired or damaged. In this embodiment, the synchronization processes provide the element recovery unit 504 with the identified data elements 302 and their associated integrity states 304.

The element recovery unit 504 then determines whether the integrity states 304 of the data element in another replica are more preferred than the integrity states 304 of the damaged or repaired data elements 302 in the replica 142. As one skilled in the relevant art would find apparent, there are numerous approaches that may be taken to determine which of the data elements 302 have an associated integrity state 304 which is other than the most preferred integrity state and determining whether any replica in the distributed database has that same data element 302 with a more preferred integrity state. All such techniques are considered to be within the scope of the present invention.

Referring to FIG. 4, the state transitions which may be caused by the application of the synchronization processes 556 are described below. As noted, the synchronization process 556 may advance the integrity state 304 to the most preferred integrity state possible. Thus, if a database element 302 has a damaged integrity state 310, it may replaced with a database element 302 having a repaired integrity state 308, as shown by the "S" contribution to state transition line 414; or a database element 302 having a valid integrity state 306, as shown by the "S" contribution to state transition line 416. Likewise, if a database element 302 has a repaired integrity state 308, it may replaced with a database element 302 having a valid integrity state 306, as shown by the "S" contribution to state transition line 418.

Should the database element 302 have a valid integrity state 306, then there will preferably be no request to obtain a more preferred copy of the database element 302 from another replica by the repair tool, as this is the most preferred integrity state. This is shown in FIG. 4 by the "S" contribution to the state transition line 406. Should the database element 302 in the other replica have an integrity state 304 which is the same or not as preferred as the current integrity state 304, then the integrity state is not changed, as shown by the "S" contribution to the state transition lines 412 and 410.

In the same manner as described above with reference to the state identification unit 502, alternative embodiment of the element recovery unit 504 also includes additional processes for determining whether a change in the integrity states 304 of a database element 302 should be made based upon the success of the application of the recovery processes on other database elements 302.

Figure 6:
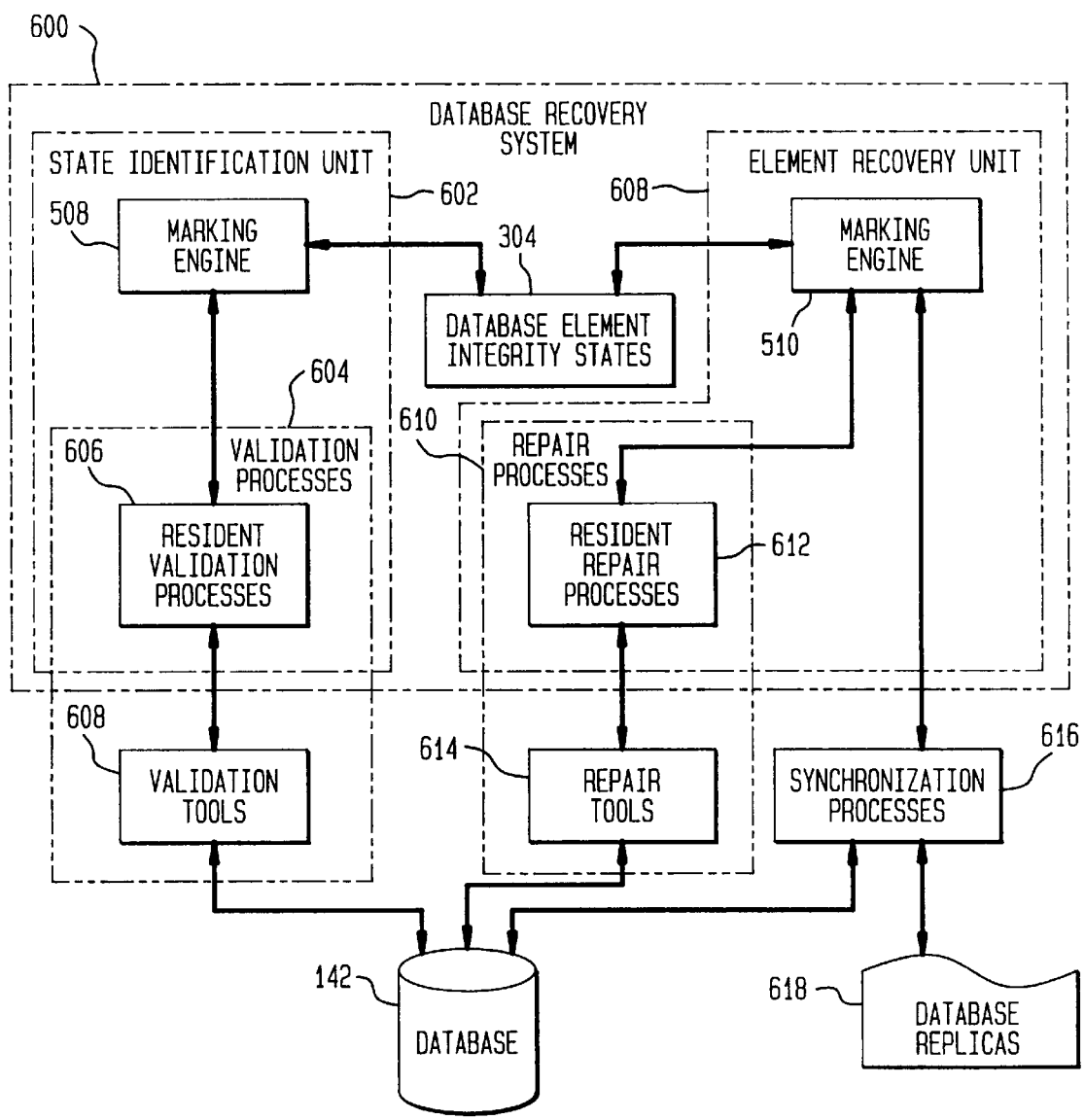
FIG. 6 is a functional block diagram of an alternative embodiment of the database recovery system of the present invention.

FIG. 6 is a block diagram of an alternative embodiment of the database recovery system of the present invention. The database recovery system 600 includes a state identification unit 602 that determines the integrity state 304 of the database elements 302 based upon validations processes 604 that include validation processes 606 resident with the state identification unit 602, and external validation tools 608 accessible to the state identification unit 602.

In accordance with this embodiment of the present invention, the state identification unit 502 interoperates with the existing validation tool 608 to determine the validity of the database elements 302. The validation tool 608 may include a disk controller verification process or other hardware or software device which is capable of determining the validity of the data stored in the data records. The external validation tools 608 may also perform the syntax and schema requirements checking noted above. In one embodiment, the validation tool 608 includes the DSRepair tool from Novell, Inc., Provo, Utah (DSRepair is a registered trademark of Novell, Inc.).

Likewise, the element recovery unit 608 includes the marking engine 510 which, in this embodiment, interfaces with repair processes 610. Repair processes 610 include resident repair processes 612 and external repair tools 614. The element recovery unit 608 may invoke the repair tool 614 and receive the results of the repair processes applied by the repair tool 614 and those performed by the resident repair processes 612. In such an embodiment, the marking engine 510 may provide the repair tool 614 with the data elements 302 having a damaged integrity state. Alternatively, the repair tool 614 may be invoked directly by the network administrator or through some automated process. The repair tool 614 provides the element recovery unit 504 with the results of the repair processes for integrity state update by marking engine 510. In one embodiment, the repair tool 614 is the DSRepair tool from Novell, Inc., Provo, Utah.

The marking engine 510 also interfaces with synchronization processes 616 which operates as noted above to obtain database elements 302 having a more preferred integrity state 340 from the database replicas 618.

Figure 7:
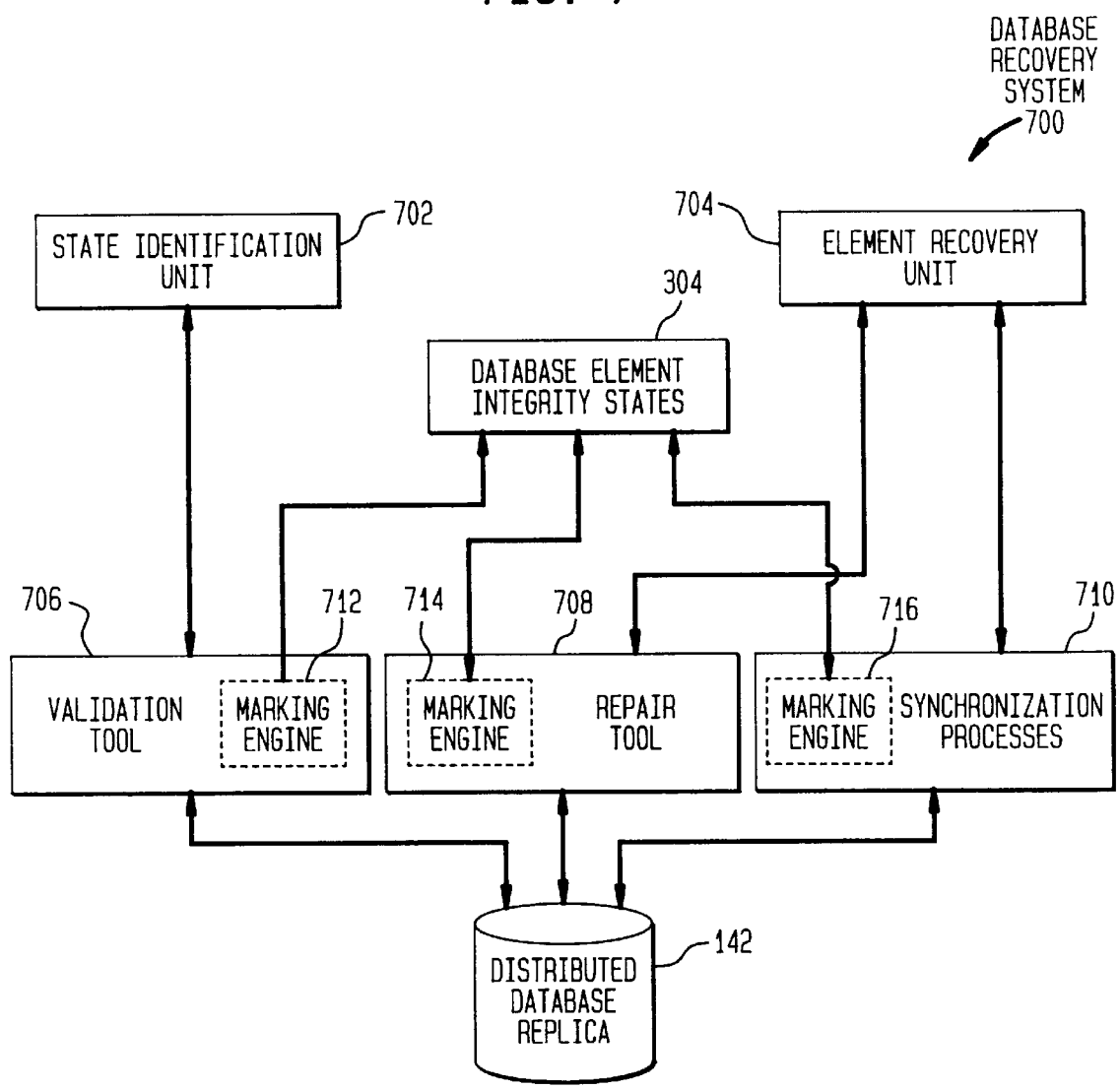
FIG. 7 is a functional block diagram of another alternative embodiment of the database recovery system of the present invention.

FIG. 7 is a block diagram of an alternative embodiment of the database recovery system of the present invention. In this embodiment, the utilized tools and processes include a marking engine to facilitate the setting of the integrity states 304 while enabling the tools and processes to be independently or externally invoked and controlled.

Database recovery system 700 includes a state identification unit 702 which invokes validation tool 706. Validation tool 706 may be any well known validation tool as described above. However, the validation tool 706 has been modified to include a marking engine 712 to set the integrity states 304 based upon the results of the validation processes invoked in validation tool 706.

As noted, the network administrator is often made aware of the occurrence of database errors by the degradation of system performance. When this occurs, the network administrator may externally invoke validation tool 706 to determine if there are indeed any significant database errors. Once implemented, the validation tool 706 will test the validity of the database elements 302 in accordance with known techniques and, using marking engine 712, set the integrity states 304 of the present invention accordingly.

Database recovery system 700 also includes element recovery unit 704 which interoperates with repair tool 708 and synchronization process 710 as described above. However, like the validation tool 706, the repair tool 708 and the synchronization process 710 each include marking engines 714 and 716, respectively. Thus, the repair tool 708 may be invoked either by the element recovery unit 704 or by an external source, such as the network administrator. Upon invocation, the repair tool 708 makes any possible repairs to the database elements 302 to remedy the condition which rendered them damaged. Any changes in the conditions of the database elements 302 as a result of these processes will result in the marking engine 714 setting the integrity states 304 accordingly.

The synchronization processes 710 may be invoked by the element recovery unit 704 or externally, such as by the network administrator or event-time or event-based occurrences. Once invoked, the synchronization processes 710 synchronize the replicas of the database 142 and, in accordance with the present invention, retrieve copies of the database elements from a remote replica which have integrity states which are more preferred than the integrity states of the database element in the database 142. If such database elements are found and subsequently replace the database elements 302 in the database 142, the marking engine 716 changes the integrity states 304 accordingly.

As one skilled in the relevant art will find apparent, any other integrity state representing any other condition or conditions of one or more selected characteristics of the database elements 302 may be determined by the database recovery system of the present invention. Alternative characteristics for which integrity states may be generated include, for example, the age of the data in the database, the source of the data, the accuracy of the data or any combination thereof.

Figure 8:
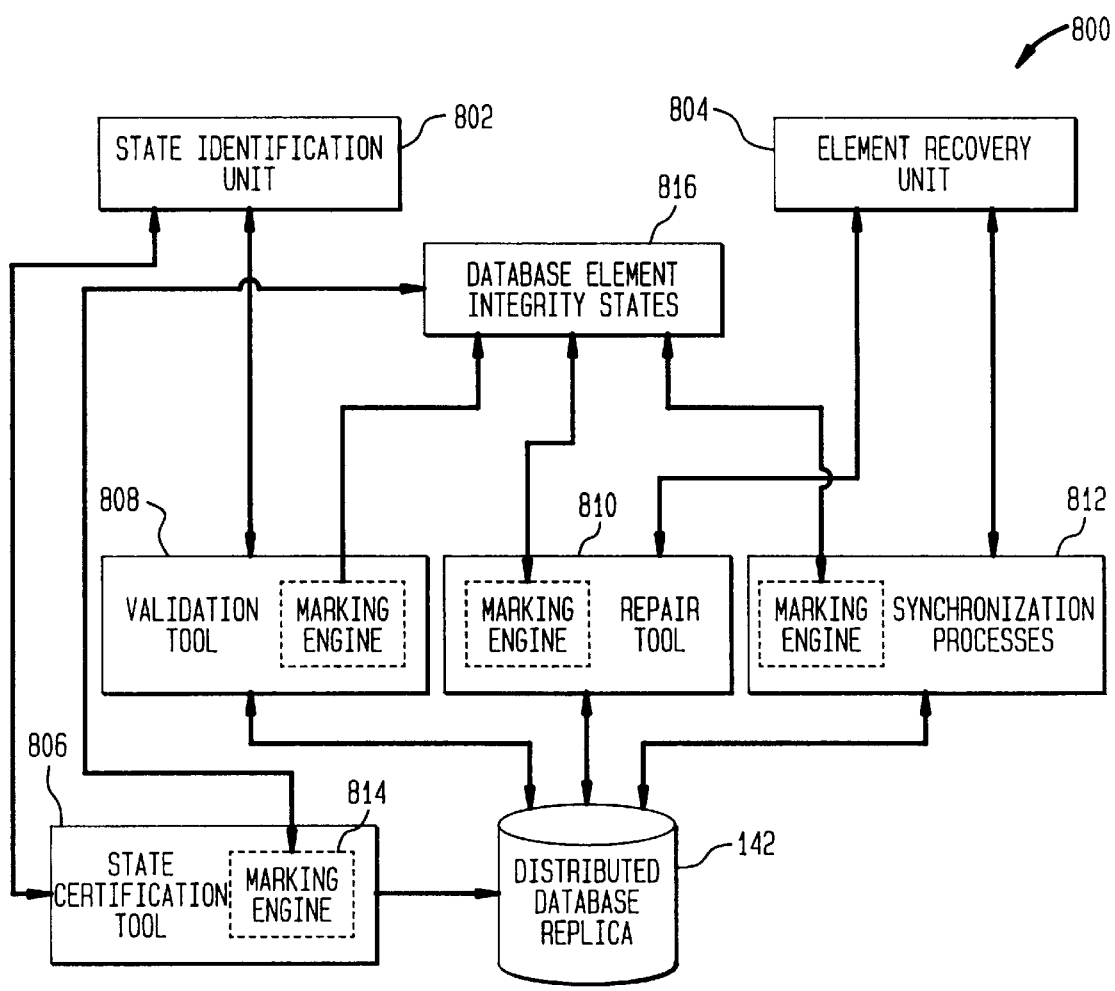
FIG. 8 is a functional block diagram of another alternative embodiment of the database recovery system of the present invention.

FIG. 8 is a functional block diagram of an alternative embodiment of the database recovery system of the present invention which includes a state certification tool 806 constructed and arranged to generate an obsolete integrity state. The obsolete integrity state represents whether the associated database element 302 has aged to such an extent that the confidence in the usefulness of the element 302 is reduced.

As shown in FIG. 8, the state certification tool 806 includes a marking engine 814 which operates in a manner analogous to the marking engines described above with reference to FIG. 7. Because the state certification tool 806 monitors conditions of the data elements 302 rather than implementing processes or procedures to change those conditions, the state certification tool 806 is invoked externally or by the state identification unit 802 of the database recovery system 800. When invoked, the state certification tool 806 accesses the database 142 to determine when the database elements 302 have been last updated. If a predetermined period of time has transpired since the last update, the marking engine 814 in the state certification tool 806 will set an "obsolete" integrity state in the database element integrity states 816.

Figure 9:
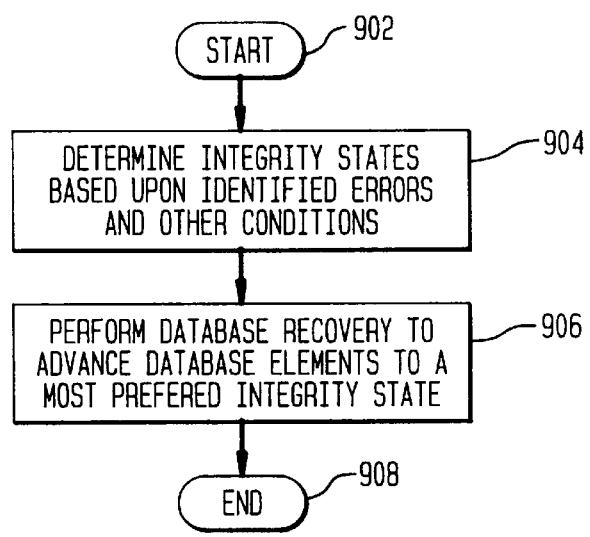
FIG. 9 is a high level flow chart of the processes performed by one embodiment of the present invention.

FIG. 9 is a high level flow chart of the processes performed by the database recovery system of the present invention. After start block 902, the database recovery system determines the integrity states of the database elements based upon identified errors and other predetermined conditions.

At step 906 the database recovery system performs various database recovery techniques to, for example, repair and replace database elements so as to advance the database elements to a most preferred integrity state. Processing is then complete at end block 908.

Figure 10:
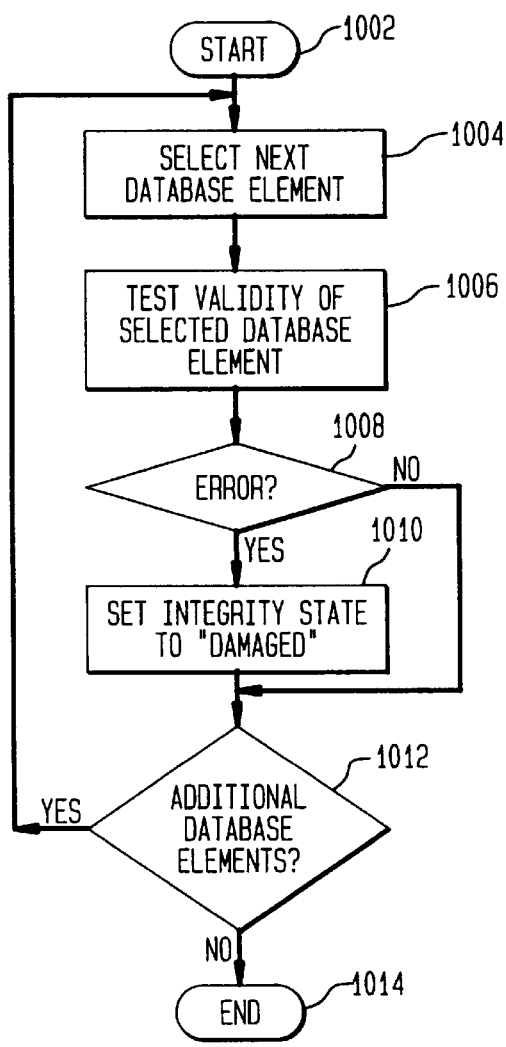
FIG. 10 is a flow chart of one embodiment of the processes performed by the present invention to determine the integrity state of the database elements based upon the results of the application of validation processes performed on the database elements.

FIG. 10 is a flow chart of the processes performed at block 904 in accordance with one embodiment of the present invention. After start block 1002, the database recovery system selects a database element at block 1004. The validity of the selected database element is determined at block 1006 in accordance with resident and/or external validation processes and tools.

If at decision block 1008 the database recovery system determines that the database element 302 has an error, then the associated integrity state is said to "damaged" at block 1010. Otherwise, processing continues at block 1012 where the process is repeated until all of the database elements in the database have been tested. Processing then completes at end block 1014.

Figure 11:
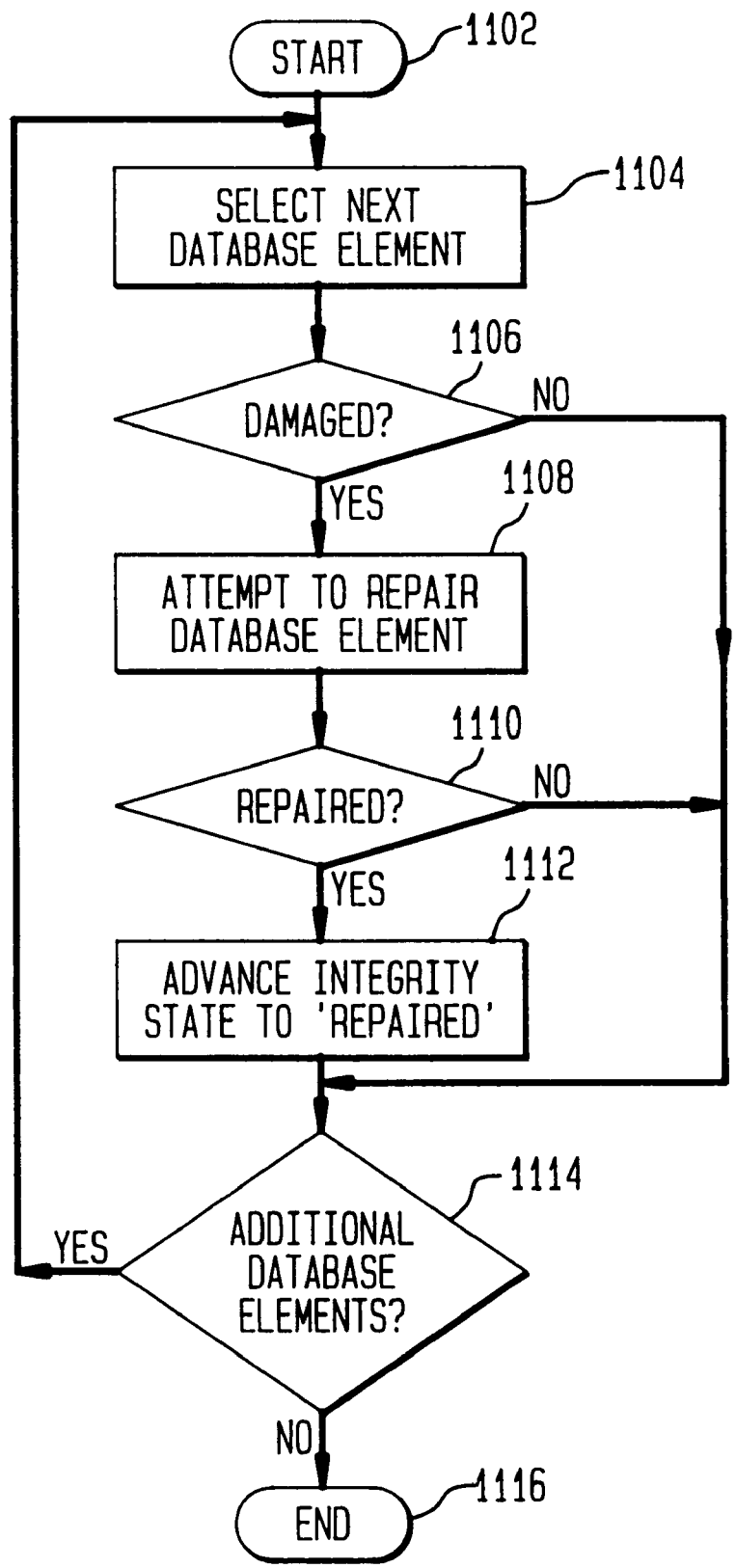
FIG. 11 is a flow chart of one embodiment of the processes performed by the present invention to determine the integrity state of the database elements based upon the results of the application of database repair tools on damaged database elements.

FIG. 11 is a flow chart of the processes performed by one embodiment of the database recovery system of the present invention at block 906 to repair database elements 302. After start block 1102, the database recovery system selects a database element at block 1104. If the associated integrity state of the selected database element is the damaged integrity state 310, then the database recovery system attempts to repair the damaged database element at block 1108. If the repair attempt was successful, block 1110, then the associated integrity state is set to the repaired integrity state 308 at block 1112.

If the selected database element 302 is not damaged or unable to be repaired, then processing continues at block 1114 and the associated integrity state remains as a damaged integrity state 310. The above process is continued for all of the database elements in the database 142 as shown by decision block 1114. Subsequently, processing ends at end block 1116.

Figure 12:
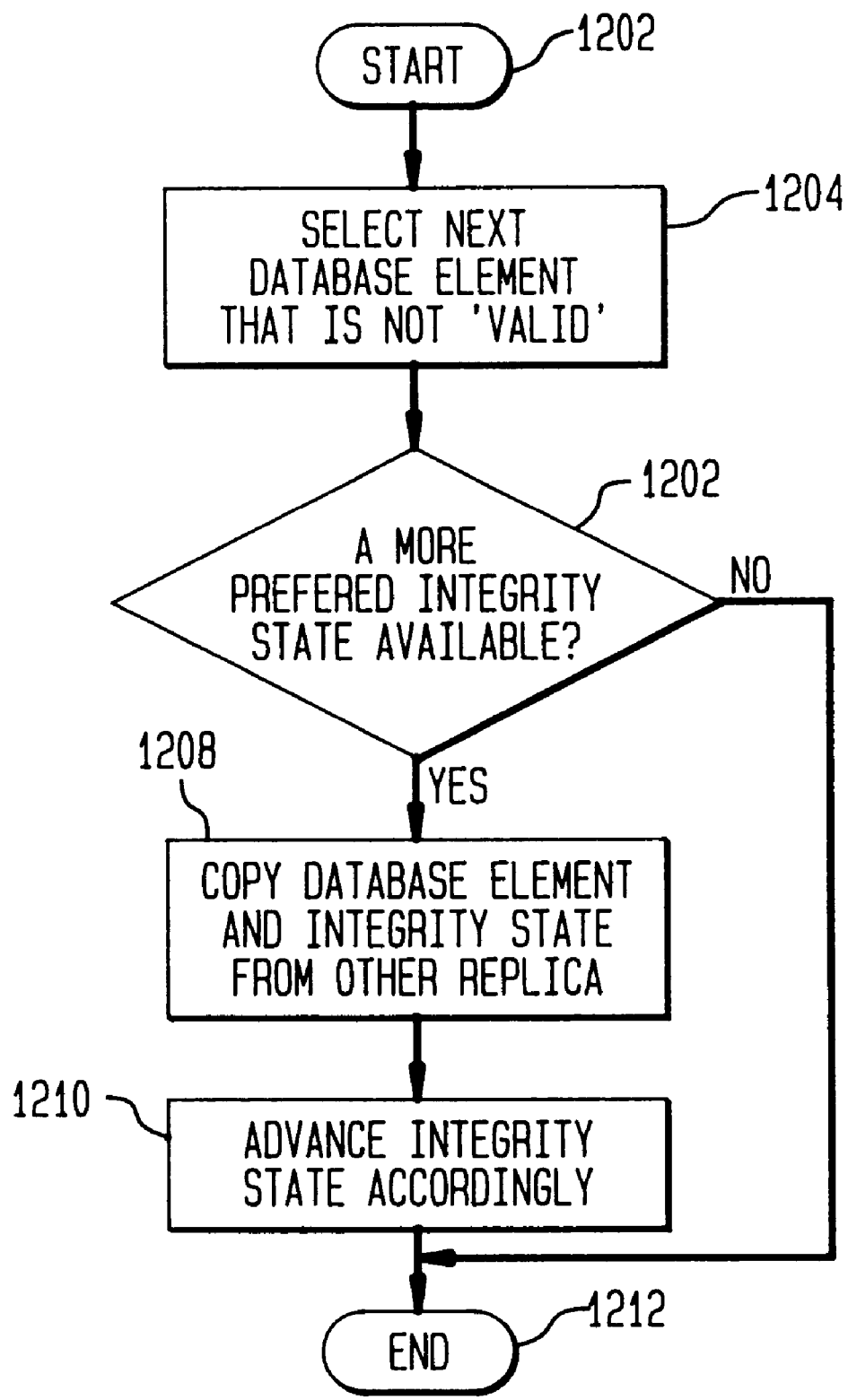
FIG. 12 is a high level flow chart of one embodiment of the processes performed by the present invention to determine the integrity state of the database elements based upon the results of the application of replica synchronization processes on the database.

FIG. 12 is a flow chart of the processes performed by one of embodiment of the database recovery system of the present invention to advance the integrity state of data elements through a replica synchronization process. After start block 1202 the database recovery system selects the next database element that does not have associated with it the most preferred valid integrity state 306 at block 1204. This information is provided to the external synchronization process which determines, at decision block 1206, whether a more preferred integrity state is available in a replica of the database currently being operated upon. If so, then the database element and its associated integrity state are copied from the other replica at block 1208 and the associated integrity state is advanced accordingly at block 1210. If a more preferred integrity state is not available from the replica, then processing advances from decision block 1206 to the end block 1212 where processing is completed.

While various embodiments of the present invention have been described above, it should be understood that they have been presented by way of example only, and not limitation. For example, embodiments of the present invention were provided above in the context of a replica of a distributed database in a server of the same local network. However, it should be understood that the present invention may be implemented with any type of database, regardless of whether it is replicated or distributed. Fore example, if the database is a non-replicated database, the synchronization processes 356 would not be implemented as there would be no other replicas with which to share data. In such an environment, the embodiment of the database recovery engine 304 would apply the repair tools 354 to repair the database. To replace the contents of the database, the database recovery engine 354 may generate a report of those logical elements that are damaged, obsolete, repaired or otherwise less than optimally preferred. Such a report may be provided in any well known manner, such as a data file stored in a memory device or output to some peripheral device 138. The network administrator can retrieve the report information, determine the damage which has occurred, and identify those portions of the database that can be replaced with some backup copy of the database. Thus, this embodiment of the database recovery system 130 is partially automatic as it can still automatically repair database elements having damaged integrity states. Thus, the breadth and the scope of the present invention are not limited by any of the above exemplary embodiments, but are defined only in accordance with the following claims and their equivalents.

What is claimed is:

1. A database recovery system for repairing a database, the database containing a plurality of user-defined database elements and a plurality of integrity states, each associated with one of the database elements, each of the plurality of integrity states representing a predetermined one or more conditions related to a characteristic of the associated database element, the database recovery system comprising:

a state identification unit constructed and arranged to determine the one or more conditions of each of the database elements, and to set the associated integrity state accordingly;

an element recovery unit constructed and arranged to improve said one or more conditions of the database elements so as to advance said plurality of associated integrity states to a more preferred integrity state;

and a memory, accessible by said state identification unit and said element recovery unit, constructed and arranged to store the plurality of associated integrity states) wherein said plurality of integrity states includes at least one of:

a valid state indicating said associated database element has not been damaged;

a repaired state indicating said associated database element was damaged and subsequently repaired; and a damaged state indicating said associated database element is damaged.

2. The system of claim 1 wherein said plurality of integrity states further comprises;

an obsolete state indicating said associated database element has not been updated for a predetermined period of time.

3. The system of claim 1 wherein each of said plurality of associated integrity states is represented by a plurality of flags, each said of said plurality of flags representing an integrity state value.

4. The system of claim 1, wherein the database is a replica of a database distributed across a plurality of nodes of a network.

5. The system of claim 4, wherein said distributed database is a global directory containing information relating to objects in the network.

6. The system of claim 1, wherein said plurality of database elements comprise predetermined logical portions of the database.

7. The system of claim 1, wherein said characteristic is database element validity, and further wherein said one or more conditions includes whether said database elements have been damaged or repaired.

8. The system of claim 1, wherein said characteristic is database element age of the database element, and further wherein said one or more conditions includes the time said database element has been updated.

9. The system of claim 1, wherein said characteristic is a source of the database element.

10. A database recovery system for repairing a database having a plurality of user-defined database elements, comprising:
a plurality of integrity states, each of said plurality of integrity states representing a predetermined one or more conditions of predetermined characteristics of an associated database element;
a state identification unit configured to identify which of said associated integrity states represents a current state of said one or more conditions; and
an element recovery unit configured to apply processes to change said one or more conditions of each of said plurality of database elements and to advance said associated integrity state from a less preferred integrity state to a more preferred integrity state, wherein said plurality of integrity states includes at least one of:
a valid state indicating said associated database element has not been damaged;
a repaired state indicating said associated database element was damaged and subsequently repaired; and
a damaged state indicating said associated database element is damaged.

11. The system of claim 10, wherein said characteristic is database element validity, and wherein said state identification unit comprises:
a validation processor configured to apply validation processes to the database so as to determine the validity of the plurality of database elements; and
a first marking engine constructed and arranged to modify said plurality of associated integrity states to reflect results of said validation processes.

12. The system of claim 11, wherein said validation processes comprise external validation tools.

13. The system of claim 12, wherein said validation processes further comprise resident validation processes configured to perform database element dependency analysis of said plurality of database elements.

14. The system of claim 12, wherein said first marking engine resides in said external validation tool.

15. The system of claim 10, wherein said element recovery unit comprises:
at least one recovery process configured to change the predetermined one or more conditions so as to advance each of said plurality of integrity states from a less preferred integrity state to a more preferred integrity state; and
a second marking engine configured to modify said plurality of integrity states to reflect results of said at least one recovery.

16. The system of claim 15, wherein said recovery processes comprise:
an external repair tool configured to repair damaged database elements; and
replacement processes configured to replace particular database elements having an associated first integrity state with a copy of said particular database elements having an associated second integrity state, wherein said second integrity state is a more preferred integrity state than said first integrity state.

17. The system of claim 16, wherein said replacement processes comprise:
backup retrieval processes.

18. The system of claim 16 wherein the database is a replicated database and wherein said replacement processes comprise:
replica synchronization processes adapted to replace particular database elements having said associated first integrity state with said copy of said particular database elements residing in a replica of the database.

19. The system of claim 16, wherein said second marking engine resides in said external repair tool.

20. A method for recovering a database including a plurality of user-defined database elements, comprising the steps of:
a) associating each of a plurality of integrity states with one of the plurality of database elements, each of said plurality of integrity states representing a predetermined one or more conditions related to a characteristic of the associated database element;
b) determining said one or more conditions of each of the database elements;
c) modifying said associated integrity states to reflect results of said step b);
d) applying recovery processes to the database to improve said one or more conditions; and
e) modifying said associated integrity states to reflect results of said step d) wherein said plurality of integrity states includes at least one of:
a valid state indicating said associated database element has not been damaged;
a repaired state indicating said associated database element was damaged and subsequently repaired; and
a damaged state indicating said associated database element is damaged.

21. The method of claim 20, wherein said characteristic is database element validity, and wherein said step b) comprises the steps of:
1) apply one or more validation processes to the database so as to determine the validity of the plurality of database elements; and
2) modifying said plurality of associated integrity states to reflect results of said step b)1).

22. The method of claim 21, wherein said step b)1) comprises the step of:
i) applying one or more external validation tools to one or more of said plurality of database elements.

23. The method of claim 22, wherein said step d)1) comprises the steps:
ii) applying an external repair tool to one or more of said plurality of database elements; and
iii) replacing particular database elements having an associated first integrity state with a copy of said particular database elements having an associated second integrity state, wherein said second integrity state is a more preferred integrity state than said first integrity state.

24. The method of claim 21, wherein said step d) comprises the steps of:
1) modifying said one or more conditions so as to advance each of said plurality of integrity states from a less preferred integrity state to a more preferred integrity state; and
2) modifying said plurality of integrity states to reflect results of said step d)1).

25. The method of claim 20, wherein said plurality of integrity states comprises:

a valid state indicating said associated database element has not been damaged;

a repaired state indicating said associated database element was damaged and repaired; and a damaged state indicating said associated database element is damaged, wherein said valid state is a most preferred integrity state and said damaged state is a least preferred integrity state.

26. A database recovery system that identifies database elements which have an associated integrity state that is a less preferred integrity state, said integrity state representing a predetermined one or more current conditions of a characteristic of the associated database element, said database recovery system repairing and replacing said database elements so as to advance said database elements to a more preferred integrity state wherein said plurality of integrity states includes at least one of:

a valid state indicating said associated database element has not been damaged;

a repaired state indicating said associated database element was damaged and subsequently repaired; and a damaged state indicating said associated database element is damaged.

27. A controller for enabling a processor to recover a replica of a distributed database, the database containing a plurality of user-defined database elements and a plurality of integrity states, each associated with one of the database elements, each of the plurality of integrity states representing a predetermined one or more conditions related to a characteristic of the associated database element, the controller comprising:

a state identifier constructed and arranged to determine the one or more conditions of each of the database elements, and to set the associated integrity state accordingly; and an element recovery mechanism constructed and arranged to improve said one or more conditions of the database elements so as to advance said plurality of associated integrity states to a more preferred integrity state wherein said plurality of integrity states includes at least one of:

a valid state indicating said associated database element has not been damaged;

a repaired state indicating said associated database element was damaged and subsequently repaired; and a damaged state indicating said associated database element is damaged.

28. A computer program product comprising a computer readable medium having computer program logic recorded thereon for enabling a processor in a computer system wherein a database is stored, to recover from errors in the database, said computer program product adapted to cause the computer system to perform the steps of:

a) associating each of a plurality of integrity states with one of the plurality of database elements, each of said plurality of integrity states representing a predetermined one or more conditions related to a characteristic of the associated database element;

b) determining said one or more conditions of each of the database elements;

c) modifying said associated integrity states to reflect results of said step b);

d) applying recovery processes to the database elements having a less preferred integrity state to improve said one or more conditions; and e) modifying said associated integrity states to reflect results of said step d) wherein said plurality of integrity states includes at least one of:

a valid state indicating said associated database element has not been damaged;

a repaired state indicating said associated database element was damaged and subsequently repaired and a damaged state indicating said associated database element is damaged.

* * * * *